United States Patent [19]
Hirose et al.

[11] Patent Number: 5,805,684
[45] Date of Patent: Sep. 8, 1998

[54] COMMUNICATION TERMINAL DEVICE

[75] Inventors: Ryota Hirose; Kazurou Tanaka; Tsuneyuki Koikeda, all of Hamamatsu, Japan

[73] Assignee: Yamaha Corporation, Hamamatsu, Japan

[21] Appl. No.: 671,680

[22] Filed: Jun. 28, 1996

[30] Foreign Application Priority Data

Jun. 30, 1995 [JP] Japan .................................. 7-166340

[51] Int. Cl.$^6$ ............................. H04M 1/56; H04M 1/00; H04L 12/16
[52] U.S. Cl. .......................... 379/142; 379/355; 370/271
[58] Field of Search .................................. 379/127, 133, 379/140, 141, 142, 157, 188, 189, 199, 201, 354, 355, 356, 373, 376; 370/259, 271, 522, 524; 435/414, 415

[56] References Cited

U.S. PATENT DOCUMENTS

| | | | |
|---|---|---|---|
| 4,894,861 | 1/1990 | Fujioka | 379/142 |
| 4,924,496 | 5/1990 | Figa et al. | 379/355 |
| 5,220,599 | 6/1993 | Sasano et al. | 379/142 |
| 5,267,307 | 11/1993 | Izumi et al. | 379/142 |
| 5,546,448 | 8/1996 | Caswell et al. | 379/142 |

FOREIGN PATENT DOCUMENTS 347155  12/1989  European Pat. Off. .

OTHER PUBLICATIONS

Tatsuhiro Naganawa, et al., "A Study of Audio Commnication Devices for ISDN", 1990 IEEE conference.

Andreas Schröter, "SOPHO_SET 138x– A new range of ISPBX telephones", Philips Telecommunication review, 1993 Mar., No. 1.

Primary Examiner—Paul Loomies
Attorney, Agent, or Firm—Pillsbury Madison & Sutro LLP

[57] ABSTRACT

A communication terminal device, interconnecting with a network system like the ISDN system, is configured by a CPU and a memory which stores calling identification numbers and called identification numbers with respect to communication companions who are registered in advance. Herein, one calling identification number and at least one called identification number are registered with respect to each communication companion. At a communication-sending event, a user designates a desired communication companion so that its calling identification number is automatically read out from the memory; and consequently, the communication terminal device automatically calls up the desired communication companion through the network system. At a communication-receiving event, the communication terminal device is informed of a calling party number corresponding to a calling party who accesses thereto through the network system. Then, the communication terminal device searches a called identification number, which coincides with the calling party number, within the called identification numbers registered in the memory. Thus, the calling party is identified based on the called identification number searched, so that the communication terminal device automatically performs a specific communication control which is set for the calling party identified.

13 Claims, 2 Drawing Sheets

| DESTINATION | 1 | 2 | ... | M |
|---|---|---|---|---|
| CALLING IDENTIFICATION NUMBER | XXXX-ABCDEF | 03-STU-VXW | ...... | 03-IJK-LMN |
| CALLED IDENTIFICATION NUMBER 1 | 03-XXX-YYY | 03-PPP-PPP | ...... | 03-IJK-LMN |
| CALLED IDENTIFICATION NUMBER 2 | | 03-QQQ-QQQ | ...... | |
| ......  | | | ...... | |
| CALLED IDENTIFICATION NUMBER N | | 03-SSS-SSS | ...... | |

FIG.2

COMMUNICATION TERMINAL DEVICE

BACKGROUND OF THE INVENTION

1. Field of the Invention

The invention relates to communication terminal devices which perform communication control based on results of identification made for communication companions.

2. Prior Art

The ISDN system (where 'ISDN' is an abbreviation for 'Integrated Services Digital Network') has a function to inform a called party of an identification number of a calling party (i.e., a calling party number) prior to execution of procedures for call connection. Therefore, the called party can identify the calling party who is a communication companion for the called party. A variety of proposals are made for the technology to perform communication control in response to the communication companion by using the above function. For example, there is provided a technique of identified-address control which is made active at a communication-arrival event of a communication terminal device so that a called party responds to communication only when a calling party number of the communication coincides with an identification number of a specific communication companion. Other techniques are provided to switch over communication tools in response to communication companions. For example, a decision is made, based on a calling party number, as to whether a terminal device of a calling party is a facsimile machine or a telephone, so that a proper communication tool (i.e., a facsimile machine or a telephone) is selected for a terminal device of a called party on the basis of result of the decision.

In order to enable the above communication control which is performed in response to a communication companion, it is necessary to provide an identification function to identify the communication companion in a communication terminal device. In the conventional communication terminal device, identification numbers, corresponding to specific communication companions to which the above communication control is applied, are registered in a memory in advance. So, at a communication-arrival event, the conventional communication terminal device employs the above communication control only when a calling party number coincides with one of the identification numbers registered in the memory.

However, there are provided some cases in which the aforementioned techniques are hard to be employed because of existence of a variety of communication services in these days.

In one case, communication companions, to which the communication terminal device applies specific communication control, contains a carrier (e.g., enterprise station) which makes a contract to use reserve charging (e.g., enterprise accounting service), for example. In this case, a general telephone number is assigned to the carrier; and other contractor numbers used for the reserve charging are also assigned to the carrier in advance. When the communication terminal device makes communication with the carrier, the communication terminal device designates a contractor number thereof. This contractor number is converted to a general telephone number by the network service control station, so that the carrier is called up based on this general telephone number. On the other hand, when the carrier makes communication with the communication terminal device, the communication control device is not informed of the contractor number, used for the reverse charging, as a calling party number but is informed of the general telephone number, assigned to the carrier, as a calling party number. As described heretofore, the communication terminal device uses different identification numbers respectively for a communication-sending event and a communication-receiving event, even with respect to the same communication companion (e.g., carrier). For this reason, the user of the communication terminal device must conduct a complicated number control.

In another case, the communication companions, to which the communication terminal device applies specific communication control, contains a group of users who use a same representative number. In that case, the communication terminal device should designate the representative number when making communication with one of the users who use the same representative number. On the other hand, when the communication terminal device receives communication from a specific user within the users who use the same representative number, the communication terminal device is informed of a general telephone number of the specific user. So, the communication terminal device must use different identification numbers respectively for a communication-sending event and a communication-receiving event. In the communication-receiving event, the communication terminal device should manage all the general telephone numbers of the users who use the same representative number. It is extremely inconvenient for the user of the communication terminal device to make such a complicated management of telephone numbers.

SUMMARY OF THE INVENTION

It is an object of the invention to provide a communication terminal device which is capable of using identification numbers, used for designating and identifying a communication companion, properly for a communication-sending event and a communication-receiving event.

It is another object of the invention to provide a communication terminal device which is capable of automatically performing a specific communication control in response to a communication companion at a communication-receiving event.

A communication terminal device of the invention is designed to interconnect with a network system like the ISDN system and is configured by a CPU and a memory which stores calling identification numbers and called identification numbers with respect to communication companions who are registered in advance. Herein, one calling identification number and at least one called identification number are registered with respect to each communication companion.

At a communication-sending event, a user designates a desired communication companion so that its calling identification number is automatically read out from the memory; and consequently, the communication terminal device automatically calls up the desired communication companion through the network system. At a communication-receiving event, the communication terminal device is informed of a calling party number corresponding to a calling party who accesses thereto through the network system. Then, the communication terminal device searches a called identification number, which coincides with the calling party number, within the called identification numbers registered in the memory. Thus, the calling party is identified based on the called identification number searched, so that the communication terminal device automatically performs a specific communication control which is set for the calling party identified.

Incidentally, the calling identification number and/or called identification number correspond to a telephone number with respect to each communication companion. In addition, a number of the called identification numbers, which are registered with respect to a communication companion, is determined based on the nature of the communication companion. If the communication companion is a carrier, its representative telephone number is stored as the called identification number; and the communication terminal device performs a specific communication control, corresponding to the reverse charging, with respect to the carrier.

BRIEF DESCRIPTION OF THE DRAWINGS

These and other objects of the subject invention will become more fully apparent as the following description is read in light of the attached drawings wherein:

FIG. 2 is a drawing showing content of a number table in which identification numbers are registered with respect to destinations respectively.

DESCRIPTION OF THE PREFERRED EMBODIMENT

Figure 1:
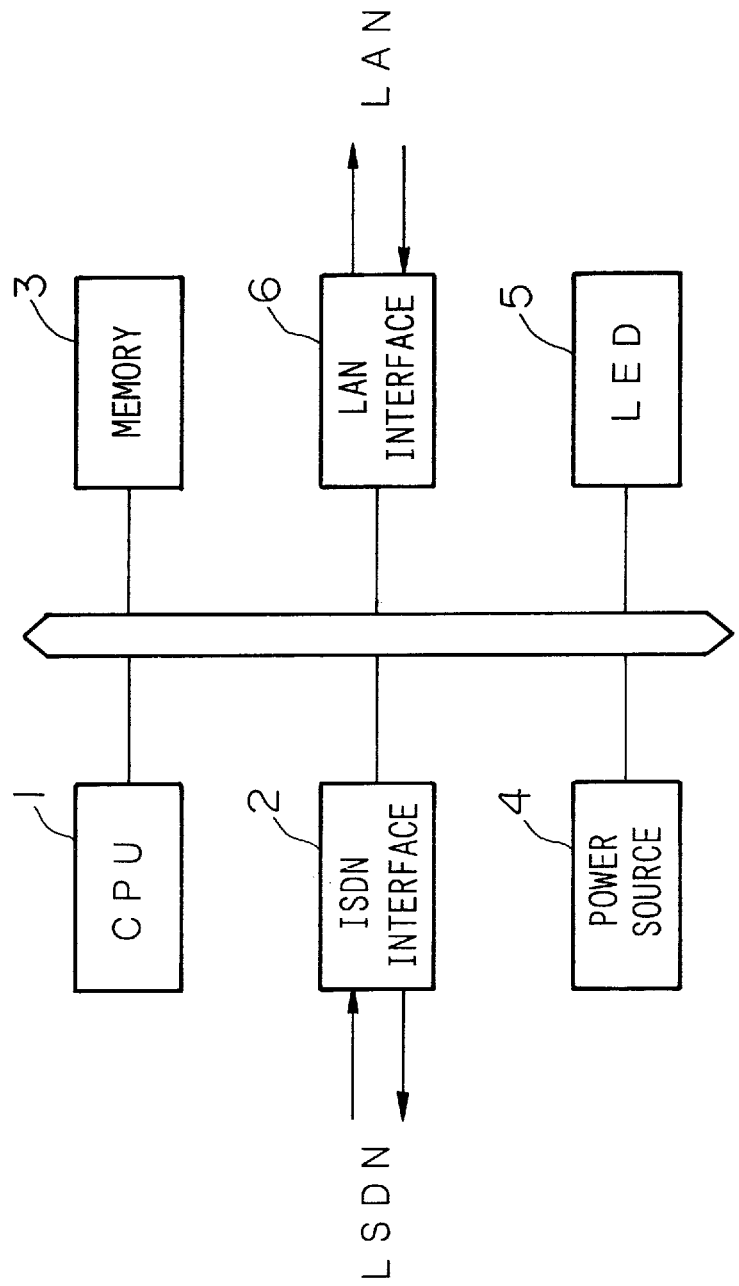
FIG. 1 is a block diagram showing a configuration of a communication terminal device which is designed in accordance with an embodiment of the invention.

FIG. 1 is a block diagram showing a configuration of a communication terminal device which is designed in accordance with an embodiment of the invention. This communication terminal device of FIG. 1 is designed to perform communication with another communication terminal device through the ISDN system. The communication terminal device of FIG. 1 is configured by a central processing unit (i.e., CPU) 1, an ISDN interface 2, a memory 3, a power source 4, a light-emitting diode (LED) 5 and a local-area-network interface (i.e., LAN interface) 6. Herein, the CPU 1 perform overall control on the communication terminal device; the LED 5 is provided to indicate a voice-communication state; and the LAN interface 6 is provided to perform data communication with a LAN. The CPU 1 is interconnected with the ISDN system through the ISDN interface 2. So, the CPU 1 performs communication-sending control and communication-receiving control; and the CPU 1 controls a variety of sections of the device, which are used to perform communication using the ISDN system, as well. Further, the communication terminal device is designed to employ a specific communication control when the device receives communication from a specific communication companion who is registered in advance. The above communication control is performed under control of the CPU 1.

The memory 3 is constructed by a non-volatile memory such as a RAM with battery backup. Thus, the memory 3 stores content of a number table which stores identification numbers defining communication companions. So, the communication companions, defined by the identification numbers stored in the number table, are subjected to the aforementioned specific communication control. FIG. 2 shows an example of the content of the number table. This example indicates that calling identification numbers and called identification numbers are registered with respect to destinations 1 to M which correspond to the communication companions respectively. Incidentally, it is possible to register maximum N called identification numbers with respect to each communication companion, i.e., each destination. The above numbers 'M' and 'N' are integers arbitrarily selected.

In FIG. 2, the destination 1 indicates a carrier which has the contract of the reverse charging, for example. As for the destination 1, a contractor number, used for the reverse charging, is registered as the calling identification number whilst a general telephone number is registered as the called identification number. The destination 2 indicates a group of users who use a same representative number, for example. As for the destination 2, the representative number is registered as the calling identification number whilst general telephone numbers, which are used by the group of users respectively, are registered as the called identification numbers 1 to N. Further, the destination M indicates a normal subscriber, wherein a same general telephone number of the subscriber is registered as the calling identification number and called identification number respectively. Registration of the calling identification number and called identification number(s) into the table with respect to each communication companion is performed by procedures which are similar to procedures regarding registration of shortened numbers for a general telephone machine. By the way, some manipulation must be required to read out a calling identification number, corresponding to a desired communication companion with whom the communication terminal device performs communication, from the table. This manipulation is similar to manipulation to designate shortened numbers for a general telephone machine.

Next, operation of the present embodiment will be described in detail.

When performing communication with a certain communication companion, the communication terminal device uses the calling identification number registered in the table. For example, the user performs manipulation to designate the destination 1 on the communication terminal device. Thus, the CPU 1 reads out the contractor number (i.e., calling identification number), used for the reverse charging, from the number table stored in the memory 3. Then, the communication terminal device sends a call-setting message, using the contractor number, to the ISDN system through the ISDN interface 2. Thus, under control of the CPU 1, a series of procedures are performed for call connection, so that communication can be performed with the destination 1.

On the other hand, at a communication-receiving event from a certain communication companion, the communication terminal device uses the calling identification number registered in the number table. That is, when detecting a calling party number of the communication companion, the CPU 1 searches a called identification number which coincides with the calling party number. If the CPU 1 finds out the called identification number, coinciding with the calling party number, within the called identification numbers registered for the destinations 1 to M, the CPU 1 determines that the communication terminal device receives communication from one of the destinations which corresponds to the called identification number found. Thus, the CPU 1 performs a specific communication control. For example, the CPU 1 allows the device to receive the communication in response to call connection. In contrast, if the number table does not register the called identification number corresponding to the calling party number, the CPU 1 does not perform the specific communication control.

According to the present embodiment described above, it is possible to automatically perform manipulation to use the identification numbers properly for the communication-sending event and communication-receiving event without imparting a load to the user. In addition, a plurality of called identification numbers can be registered with respect to each communication companion. So, a group of users, who use a same representative number, can be united as one communication companion who is easily treated by the communication terminal device.

Incidentally, the present embodiment describes that the communication terminal device is used for the ISDN system. However, the invention is not limited to this embodiment. Hence, the invention is applicable to all communication systems each of which is designed to inform a called party of a calling party number or the like.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. A communication terminal device comprising:

storing means for storing one calling identification number and at least one called identification number with respect to each communication companion; and control means for, during a communication sending-event, reading out a calling identification number, corresponding to a desired communication companion, from the storing means to call up the desired communication companion, and during a communication-receiving event, the control means identifies a communication companion based on a calling party number, which is provided through a network, and a called identification number from the at least one called identification number stored in the storing means, so that the control means performs communication control in response to the called identification number for the identified communication companion.

2. A communication terminal device, which sends or receives communication with respect to a communication companion through an ISDN system, the communication terminal device comprising:

a memory for storing calling identification numbers and called identification numbers with respect to communication companions who are registered in advance, wherein the memory stores one calling identification number and at least one called identification number with respect to each communication companion;

communication sending means, which is made active when a user designates a desired communication companion, for automatically reading out a calling identification number, corresponding to the desired communication companion, to call up the desired communication companion; and communication receiving means, which is made active when a calling party calls up the communication terminal device, for searching a called identification number which coincides with a calling party number of the stored at least one called identification number and which is provided by the ISDN system in response to the calling party to identify the calling party within the communication companions who are registered in the memory; and communication control means, which is made active when the communication receiving means succeeds to identify the calling party, for performing a specific communication control which is set for the calling party corresponding to one of the communication companions registered in the memory.

3. A communication terminal device according to claim 2, wherein the calling identification number and the at least one called identification number correspond to a telephone number which is registered in the memory with respect to each communication companion.

4. A communication terminal device according to claim 2, wherein the memory is constructed by a RAM.

5. A communication terminal device, which sends or receives communication with respect to a communication companion through an ISDN system, the communication terminal device comprising:

a memory that stores calling identification numbers and called identification numbers with respect to communication companions who are registered in advance, wherein the memory stores one calling identification number and at least one called identification number with respect to each communication companion;

a communication transmitter, which is made active when a user designates a desired communication companion, that automatically reads out a calling identification number, corresponding to the desired communication companion, to call up the desired communication companion; and a communication receiver, which is made active when a calling party calls up the communication terminal device, that searches a called identification number which coincides with a calling party number of the stored at least one called identification number and which is provided by the ISDN system in response to the calling party to identify the calling party within the communication companions who are registered in the memory; and a communication controller, which is made active when the communication receiver succeeds in identifying the calling party, that performs a specific communication control which is set for the calling party corresponding to one of the communication companions registered in the memory.

6. A communication terminal device according to claim 5, wherein the calling identification number and the at least one called identification number correspond to a telephone number which is registered in the memory with respect to each communication companion.

7. A communication terminal device according to claim 5, wherein the memory is constructed by a RAM.

8. A communication terminal device according to claim 5, wherein each of the at least one called identification number identifies a particular service to be provided by the communication terminal device.

9. A communication terminal device according to claim 5, wherein each of the at least one called identification number identifies a specific party belonging to a group that utilizes each communication companion.

10. A communication terminal device according to claim 1, wherein each of the at least one called identification number identifies a particular service to be provided by the communication terminal device.

11. A communication terminal device according to claim 1, wherein each of the at least one called identification number identifies a specific party belonging to a group that utilizes each communication companion.

12. A communication terminal device according to claim 2, wherein each of the at least one called identification number identifies a particular service to be provided by the communication terminal device.

13. A communication terminal device according to claim 2, wherein each of the at least one called identification number identifies a specific party belonging to a group that utilizes each communication companion.

* * * * *